United States Patent [19]

Bennett, Jr.

[11] Patent Number: 5,136,952
[45] Date of Patent: Aug. 11, 1992

[54] AIR BAG EXPLOSIVE CONTAINER DEVICE AND METHOD

[75] Inventor: Robert E. Bennett, Jr., Mesa, Ariz.

[73] Assignee: John McDavid, Summerton, S.C.

[21] Appl. No.: 616,907

[22] Filed: Nov. 21, 1990

[51] Int. Cl.⁵ .............................................. C06D 5/00
[52] U.S. Cl. ................................... 102/530; 102/468; 280/741; 428/469
[58] Field of Search ............... 102/514, 530, 531, 468; 280/741; 428/469

[56] References Cited

U.S. PATENT DOCUMENTS

| | | | |
|---|---|---|---|
| 387,651 | 8/1888 | Mayim | 102/468 |
| 3,507,633 | 4/1970 | Dewez | 428/469 |
| 4,041,868 | 8/1977 | Rayle et al. | 102/468 |
| 4,228,221 | 10/1980 | Rohowetz | 428/469 |
| 4,812,365 | 3/1989 | Saunders et al. | 428/469 |
| 5,004,586 | 4/1991 | Hayashi et al. | 102/530 |

FOREIGN PATENT DOCUMENTS 6512 of 1886 United Kingdom ............... 102/468
464139 4/1937 United Kingdom ............... 102/468

Primary Examiner—Harold J. Tudor
Attorney, Agent, or Firm—Harry M. Weiss; Antonio R. Durando

[57] ABSTRACT

An air bag explosive container device for use in inflating an air bag upon receipt of a sensor signal that indicates a collision. The container device includes a lower cylinder portion and an upper cap portion, threadedly connected together and enclosing a chamber for an explosive material. The lower cylinder portion and upper cap portion each consist of (a) carbon iron alloy base material and an outer protective oxide coating located thereon thereby providing both high strength and anticorrosion properties, ease of manufacture, and much lower cost of manufacture.

2 Claims, 1 Drawing Sheet

AIR BAG EXPLOSIVE CONTAINER DEVICE AND METHOD

BACKGROUND OF INVENTION

1. Field of Invention

The invention generally relates to an air bag explosive container device and method, and, in particular, the invention relates to an air bag explosive container device wherein the device comprises a metal base structure having a protective coating thereon and to a method of manufacture therefor.

2. Description of the Prior Art

The need for increased safety for people riding in various vehicles has become more and more important especially since the speed limits on many highways has increased in recent years. In recent times, the development of the air bag for protecting the people riding in various vehicles has become one of the leading safety innovations for protecting these people.

Accordingly, various component parts used in air bag systems have become exceedingly important and critical in providing very reliable and safe operating air bag systems. Thus, each of the component parts of an air bag system need to be extremely reliable and safe in the event of emergency use during the period of time that the vehicle is in operation. Also, each of these component parts needs to be able to perform their critical functions over an extended period of time because it may be many months or possibly even years before these component parts may be used in an emergency situation.

Therefore, the reliability of each of these component parts of an air bag safety or protection system over a lengthy or extended period of time is exceedingly important. Additionally, besides the important consideration of reliability, there are significant cost considerations that must also be calculated, evaluated and integrated into the total consideration of the use and implementation of these air bag safety or protection systems. Obviously, if the component parts of an air bag system is exceedingly expensive or costly, then the total cost of the air bag system that uses all of the expensive or costly component parts becomes too high for practical application or implementation in various vehicles.

In many situations, there are multiple levels of costs that have to be considered. For example, a manufacturer or vendor of a component part that is used in an air bag system needs to carefully calculate the total costs in manufacturing their component part in the volume quantities that are needed and then add an amount for profitability on the component part. Then, the purchaser of these component parts from the manufacturer thereof who has paid the total price which includes the manufacturing cost and profitability amount has to then add a percentage or multiplication factor when combining or assembling all of these component parts into an air bag safety system so that when they sell their air bag system to the vehicle manufacturer, such as G.M., Ford or Chrysler, they will be able to be paid for their costs in the assembly or manufacture of the total air bag system plus an amount for profitability on the entire system. Similarly, the vehicle manufacturer purchasing the air bag system usually will factor in their cost of the purchase of the air bag system plus some amount for profitability which is passed on to the purchaser of the vehicle as part of the purchase price of the vehicle. Therefore, manufacturers of vehicles and the vendors or manufacturers of the air bag systems are always concerned about costs of component parts which directly impacts upon the costs of air bag systems which correspondingly directly affects the total cost of the vehicles containing these air bag systems. A savings of even a few cents on a component part without sacrificing quality or reliability is the goal and objective of every manufacturer.

Thus, each of the component parts of air bag systems are consistently being carefully analyzed and scrutinized for both reliability and cost. While in many situations there is a trade-off between cost and reliability, air bag systems for vehicles cannot enjoy such a trade-off since the high degree of reliability of the component parts for these air bag systems must be maintained.

It is extremely desirable to create component parts for use in air bag systems that achieve the goal of providing a high degree of reliability, but yet are also less expensive than other similar functioning component parts. Therefore, any reduction in the cost of these component parts while maintaining the same reliability factor is exceedingly important in the manufacture or sale and use of air bag systems. For example, a savings of only a few cents for a component part is usually considered to be a major accomplishment because of the overall savings that are achieved due to the inherent multi-level factoring described above when the component part's costs are increased from (a) the level of the component manufacturer to (b) the level of the air bag system manufacturer to (c) the vehicle manufacturer and finally to (d) the vehicle purchaser. Again, any component part savings must still result in providing a component part that is just as reliable as the prior component part that does not have the same cost savings features as the newer less expensive component part.

The prior art air bag explosive container device included a lower cylinder portion having apertures and an internally threaded portion at an open end thereof, and an upper cap portion which had a cylindrical shaped external threaded portion for connection to the lower cylinder portion's threaded portion and which together enclosed a chamber for containing an explosive material such as AZIDE (that is currently used in such a device) wherein both the lower cylinder portion and the upper cap portion are each made of stainless steel.

One problem with this prior art air bag explosive container device is that the stainless steel material of the lower cylinder portion needs to have several apertures machined or formed to thereby provide a gas release means when the AZIDE explosive material contained therein is caused to explode. Also, both the upper cap portion and the lower cylinder portion needed to have its respective threaded portion machined or formed for connection of the upper cap portion to the lower cylinder portion and also needs to have a single aperture formed in the upper cap portion to permit electrical wires to pass therethrough into the lower cylinder portion to serve as ignition wires for the explosive material contained therein. All of this machining work on stainless steel parts, which are inherently more expensive to produce because of the costs associated with both fabricating high purity stainless steel parts and the difficulty in machining such stainless steel parts, are relatively difficult fabrication operations and costly to machine. Another problem is that the AZIDE explosive material that is used inside the device has toxic chemical elements which causes corrosion and the like.

SUMMARY OF THE INVENTION

Accordingly, it is an object of this invention to provide an improved air bag explosive container device and method.

It is a further object of this invention to provide an improved air bag explosive container device and method which is much less expensive and just as reliable as prior air bag explosive container devices.

It is still another object of this invention to provide an improved air bag explosive container device and method which has a protective coating layer that protects the metal material of the device against corrosion or chemical attack from the AZIDE explosive material's chemicals thereby providing a very reliable device.

According to the present invention, an air bag explosive container device is provided. This container device comprises a lower cylinder portion having apertures, and an upper cap portion which is threadedly connected to the lower cylinder portion and which together enclose a chamber for containing an explosive material, wherein the lower cylinder portion and the upper cap portion each is made of metal such as a carbon iron alloy base structure having a protective insulating oxide coating thereon.

By using the carbon iron alloy base structure and the protective oxide coating, the problems of relatively difficult machining, and corrosion by the toxic chemical substances of the explosive material or element, and relatively high cost of manufacture, are avoided.

The foregoing and other objects, features and advantages will be apparent from the following description of the preferred embodiment of the invention as illustrated in the accompanying drawings.

DESCRIPTION OF THE PREFERRED EMBODIMENT

Figure 1:
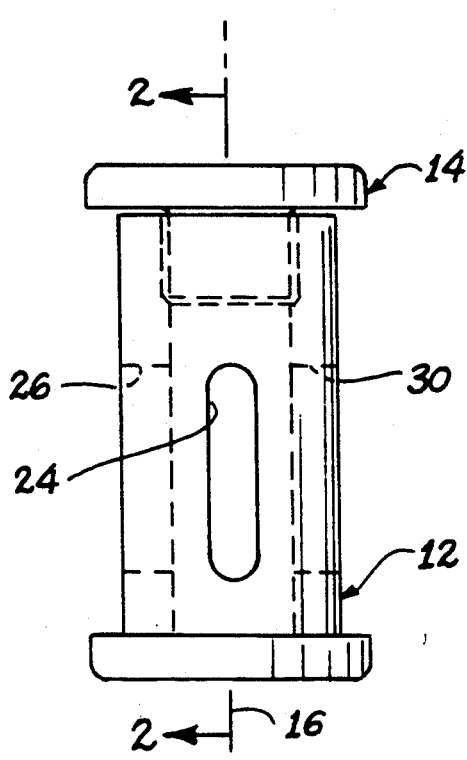
FIG. 1 is a side elevational view of the air bag explosive container device of this invention.
Figure 2:
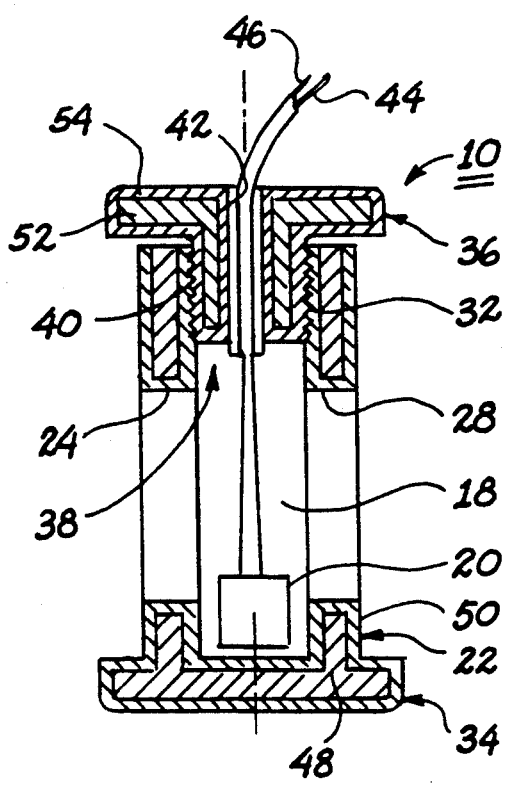
FIG. 2 is a sectional view taken on line 2—2 FIG. 1.
Figure 3:
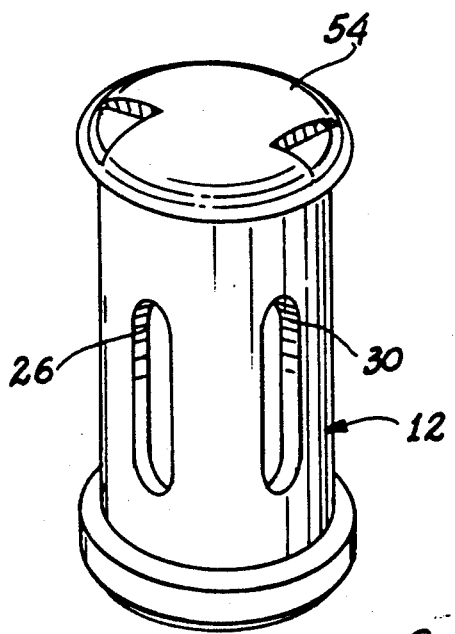
FIG. 3 is a perspective view of the air bag explosive container device of FIG. 1.

As shown in FIGS. 1, 2 and 3, an air bag explosive container device 10 is provided. Container device 10 has a lower cylinder portion 12, and an upper cap portion 14, which are coaxial along axis 16, and which together enclose a chamber 18 for containing an explosive material 20 (see FIG. 2). Explosive material 20 is preferably the explosive material sold under the trademark "AZIDE", and which is a conventional explosive material. This AZIDE explosive material is comprised of chemical toxic materials that corrode or eat away at metal surfaces causing their deterioration.

Lower cylinder portion 12 has a peripheral wall 22, which preferably has four elongated apertures 24, 26, 28, 30 (see FIGS. 1 and 2). Lower cylinder portion 12 also has interior threads 32 at its open end (see FIG. 2). Lower cylinder portion 12 also has an end wall 34.

Upper cap portion 14 has an end wall 36 and has a stem portion 38, which has exterior threads 40. Upper cap portion 14 also has a center opening 42, which extends through stem portion 38 and end wall 36.

Explosive material 20 preferably has two wires 44, 46, which are located within the explosive material 20 and which extend upwardly through center opening 42 in the upper cap portion 14, and which connect to an exterior sensor (not shown) which is coupled to a battery source for activating the explosive material 20, when required, which is when the sensor senses a vehicle collision impact.

Lower cylinder portion 12 has a metal base structure 48 and has a protective coating 50 disposed over the entire surface of the metal base structure 48. Upper cap portion 14 also has a metal base structure 52 and a similar protective coating 54 disposed over the entire surface thereof. Structures 48 and 52 are preferably made from carbon iron alloy metal stock, such as the carbon-iron alloy containing approximately 0.46 weight percent carbon, 0.87 percent manganese, 0.019 percent phosphorous, 0.075 percent sulphur, 0.26 percent silicon, 0.16 percent nickel, 0.93 percent chromium, 0.20 percent molybdenum, 0.29 percent copper, and 0.04 to 0.06 percent selenium, which is sold by Copperweld Steel Company under the trademark "SUPER-CUT 150". This particular carbon iron alloy has been found to be extremely useful because it has elasticity which permits this material to be able to stretch without breaking. Thus it is relatively much easier to machine than stainless steel and yet it is a very strong metal material that can be used to provide a structural strong material for use as an air bag explosive container device. Stainless steel was found to be more brittle so that during the explosion phase the threads would not always hold the cap which then flew off and became a dangerous missile that could seriously harm a person in the vehicle. This did not happen when using the "SUPER-CUT 150" material with the composition detailed above. Coatings 50, 54 preferably are oxide layers that are formed either during an anodizing operation where the metal base structures serve as the anode or using a dip coating type of oxide forming process. Other oxide deposition techniques such as the use of RF sputtering etc. can also be used to form the insulating or oxide protective coatings 50 and 54.

The method of making the air bag explosive container device 10 includes the steps of, machining from the above noted carbon iron alloy stock a lower cylinder portion 12 having an end wall 34 and having a peripheral wall 22 with four elongated apertures 24, 26, 28, 30 and with internal threads 32, then machining from the same carbon iron alloy stock an upper cap portion 14 having an end wall 36 and having an opening 42 and having a stem portion 38 with exterior threads 40, then coating the lower cylinder portion and the upper cap portion with respective oxide or insulating protective layers, then placing explosive material 20 within chamber 18, and connecting first ends of two wires 44, 46 to the explosive material 20 and extending wires 44, 46 through opening 42 of the upper cap portion 14 to the exterior thereof for connection to a collision impact sensor.

Additional advantages of container device 10 are indicated hereafter.

A) Relative difficult machining of the prior art container is avoided.

B) Corrosion of container device 10 is substantially avoided. This is important because even stainless steel parts sometimes have undesired impurities therein that will affect the stainless steel anticorrosion properties.

C) The cost of manufacture of container device 10 is greatly minimized. In fact, the cost of this new container device 10 was only $2 when compared to a $5 cost for the stainless steel device resulting in an incredible and unexpected savings of 60% while still providing an exceedingly reliable device.

While the invention has been described in its preferred embodiment, it is to be understood that the words which have been used are words of description rather than limitation and that changes may be made within the purview of the appended claims without departing from the true scope and spirit of the invention in its broader aspects.

The embodiments of an invention in which an exclusive property or right is claimed are defined as follows; I claim:

1. An air-bag explosive-container device comprising, in combination:
   a lower cylinder portion having a plurality of apertures and an open end having a threaded portion defining said open end; and
   an upper cap portion having a threaded portion connecting to the threaded portion of the lower cylinder portion and together with the lower cylinder portion enclosing a chamber for an explosive material;
   wherein said lower cylinder portion and said upper cap portion are made with carbon-iron alloy material containing approximately 0.46 weight percent carbon, 0.87 percent manganese, 0.019 percent phosphorous, 0.075 percent sulphur, 0.26 percent silicon, 0.16 percent nickel, 0.93 percent chromium, 0.20 percent molybdenum, 0.29 percent copper, and 0.04 to 0.06 percent selenium; and wherein protective insulating oxide coating means is disposed over the entire surface of said alloy material for protecting said alloy material of said lower cylinder portion and of said upper cap portion from possible corrosion due to contamination caused by the explosive material contained in said chamber.

2. An air-bag explosive-container device comprising, in combination:
   a lower cylinder portion and an upper cap portion connected coaxially along a common axis and together enclosing a chamber for containing an explosive material;
   said lower cylinder portion having a cylindrical wall with a plurality of peripheral apertures, having threads at an open end thereof, and having an end wall at the other end thereof;
   said upper cap portion having an end wall and having a stem portion having threads thereon engaging the threads of said lower cylinder portion and having an opening extending through the stem portion and the end wall for wires to extend to the explosive material;
   said lower cylinder portion having a metal base structure made from carbon-iron alloy metal stock and having a protective coating of an oxide layer; and
   said upper cap portion having a metal base structure made from carbon-iron alloy metal stock and having a protective coating of an oxide layer,
   wherein said carbon-iron alloy metal stock contains approximately 0.46 weight percent carbon, 0.87 percent manganese, 0.019 percent phosphorous, 0.075 percent sulphur, 0.26 percent silicon, 0.16 percent nickel, 0.93 percent chromium, 0.20 percent molybdenum, 0.29 percent copper, and 0.04 to 0.06 percent selenium.

* * * * *